United States Patent [19]

Comer, Jr.

[11] 4,240,614

[45] Dec. 23, 1980

[54] SHEAVE BLOCK AND SEAL ASSEMBLY THEREFOR

[75] Inventor: Glen S. Comer, Jr., Dunlap, Ill.

[73] Assignee: Caterpillar Tractor Co., Peoria, Ill.

[21] Appl. No.: 18,952

[22] Filed: Feb. 2, 1979

[51] Int. Cl.³ .............................................. B66D 1/36
[52] U.S. Cl. ................................... 254/393; 308/36.1; 254/416
[58] Field of Search .................... 254/190 R, 192, 193, 254/194, 195, 196, 197, 188, 189; 277/152, 153, 157, 96.2, 212 C, DIG. 6; 308/36.1, 135, 187.1, DIG. 8, DIG. 9; 226/194, 196

[56] References Cited

U.S. PATENT DOCUMENTS

| 511,766 | 1/1894 | Ferrall | 254/192 |
|---|---|---|---|
| 1,642,979 | 9/1927 | Timbs et al. | 254/192 |
| 1,880,608 | 10/1932 | Venable | 254/192 |
| 2,272,826 | 2/1942 | Bardsley | 254/193 |
| 2,282,633 | 5/1942 | Young | 254/192 |
| 2,736,585 | 2/1956 | Riesing | 277/153 |
| 3,561,776 | 2/1971 | Wilson | 277/212 C |
| 3,810,637 | 5/1974 | Bonvin | 277/96.2 |
| 4,166,627 | 9/1979 | Bainard | 277/212 C |

*Primary Examiner*—John M. Jillions
*Attorney, Agent, or Firm*—Wegner, Stellman, McCord, Wiles & Wood

[57] ABSTRACT

A seal assembly and a sheave block utilizing said assembly in which a housing (H) mounts a central shaft (12) on which a plurality of sheaves (40–43) are rotatably mounted. A free-floating spacer ring (60) is positioned on the central shaft between each of the sheaves and between a sheave and the housing and has a hard wearing smooth surface as provided by chrome-plating, and a pair of lip seals (62,63) of elastic material are positionable, one on each face of a sheave and an adjacent surface of the housing, with each having a part (64,65) thereof defining a hard wearing low friction bearing surface for sealing engagement with the surface of the spacer ring.

8 Claims, 3 Drawing Figures

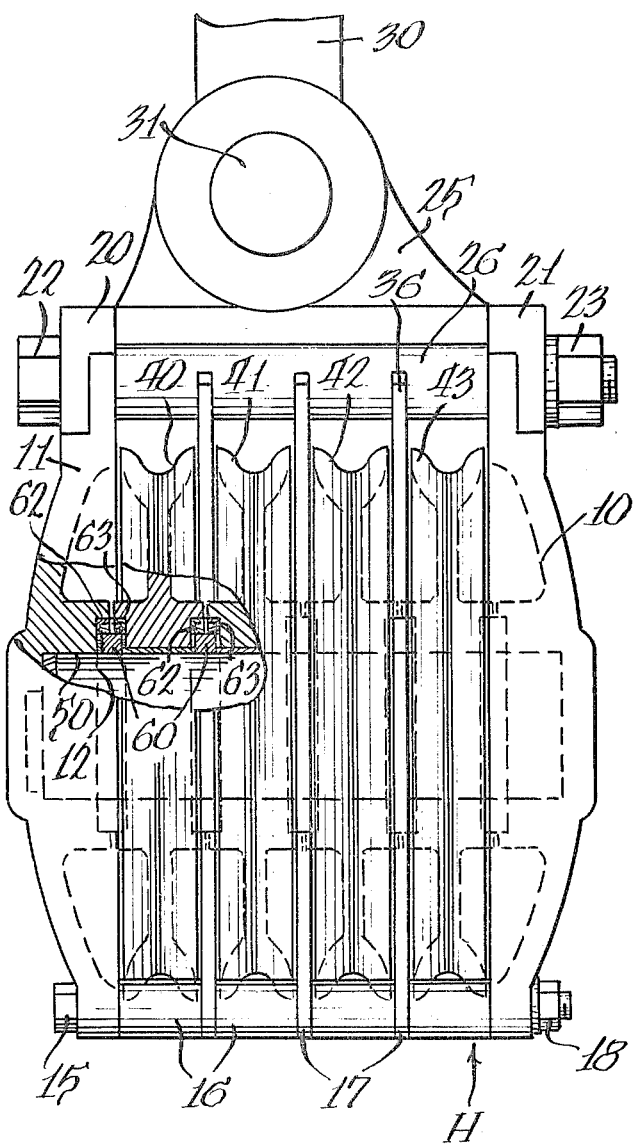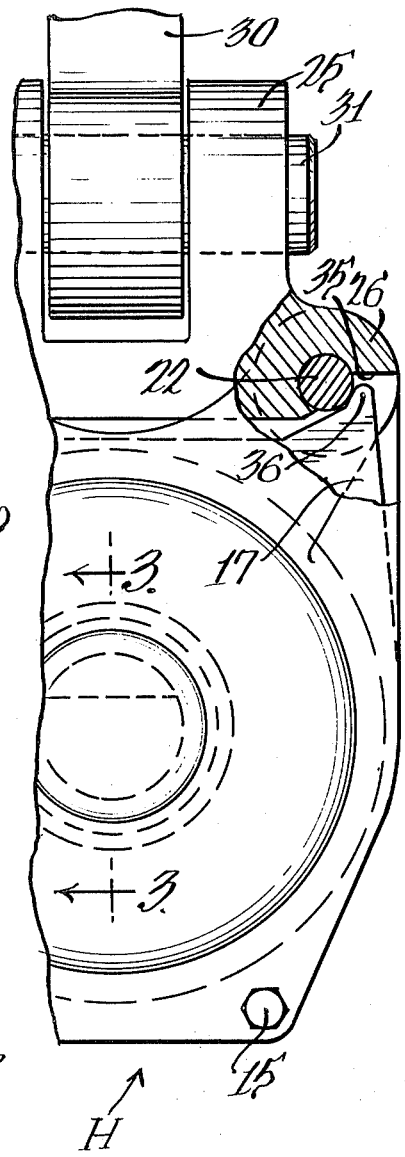

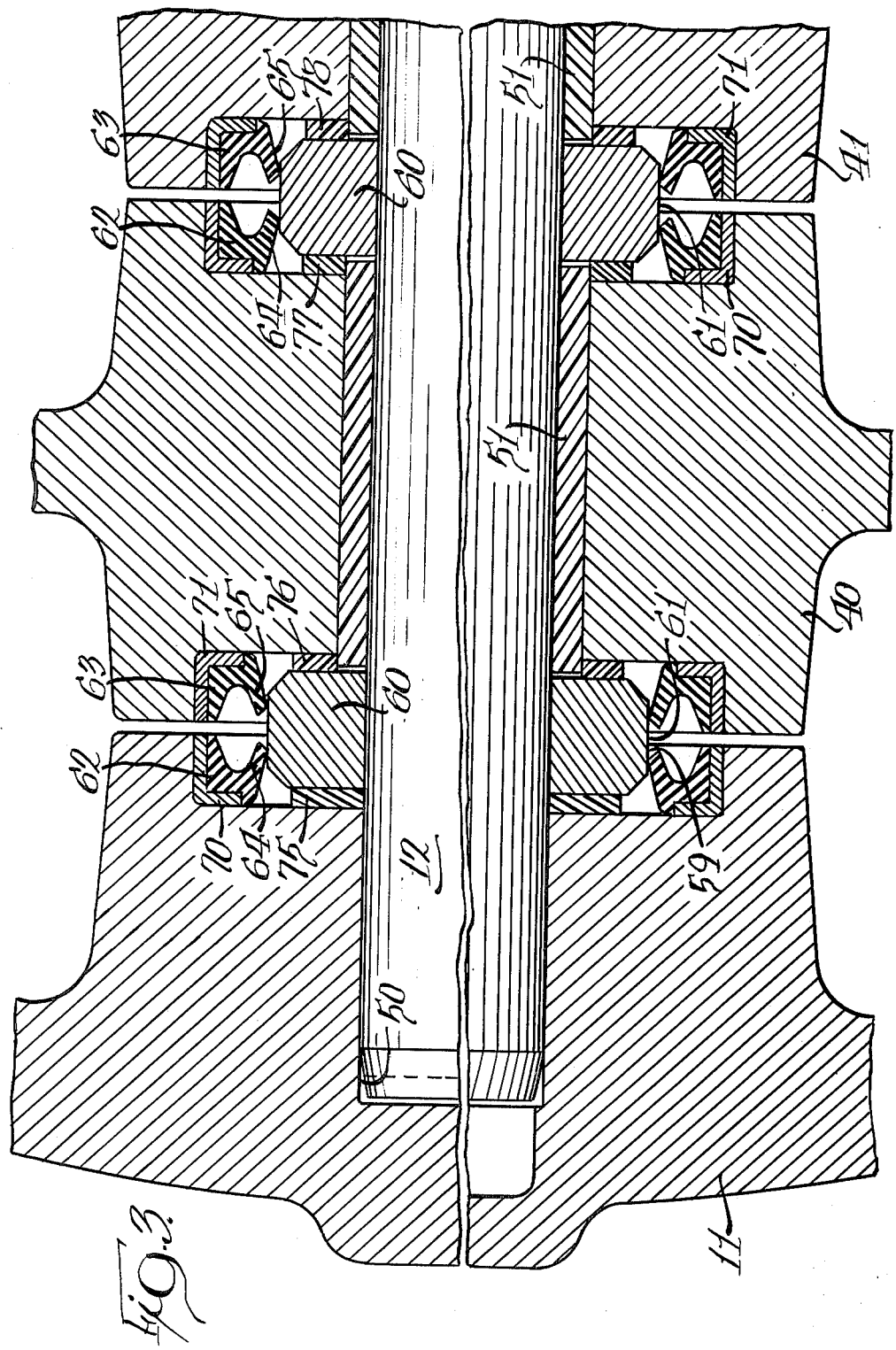

SHEAVE BLOCK AND SEAL ASSEMBLY THEREFOR

DESCRIPTION

Technical Field

This invention relates to a seal assembly for sealing lubricated dry bearings and a sheave block having such seal assembly.

Background Art

Sheave blocks having one or more sheaves have commonly used "wet" bearings which require periodic lubrication. Frequently, location of the sheave block in use has made access thereto difficult for lubrication and the requirement for lubrication increases time required for maintenance of equipment.

DISCLOSURE OF INVENTION

The present invention is directed to overcoming one or more of the problems as set forth above.

According to the present invention, a seal assembly utilizes a free-floating spacer ring mounted on a central shaft positionable between two relatively rotatable members, such as a pair of sheaves, or a sheave and a sheave housing of a sheave block, and a pair of lip seals of elastic material positionable one on each of the members. Each lip seal has a part thereof defining a hard wearing low friction bearing surface for sealing engagement with a hard wearing smooth surface of the spacer ring, as provided by chrome-plating thereof. The seal assembly enables the use of dry lubricated bearings in a sheave block.

BRIEF DESCRIPTION OF THE DRAWINGS

FIG. 1 is a front elevation of a sheave block embodying the invention, with parts broken away;

FIG. 2 is a fragmentary side elevational view, looking toward the left of the sheave block, as viewed in FIG. 1 and with parts broken away; and FIG. 3 is a vertical section, on an enlarged scale, taken generally along the line 3—3 in FIG. 2.

BEST MODE FOR CARRYING OUT THE INVENTION

A sheave block embodying the seal assembly is shown generally in FIGS. 1 and 2. The sheave block has a housing, indicated generally at H, defined by a pair of end plates 10 and 11 which support a central shaft 12, extending therebetween. The end plates 10 and 11 are generally rectangular and are provided with openings at the lower corners thereof to receive a pair of bolts extending therethrough, with one of the bolts being shown at 15. A series of spacers 16 are interfitted with the lower ends of a plurality of center plates 17 with the bolts extending through openings therein. These parts are held in assembled relation by a nut threaded on each of the bolts, with the nut 18 shown associated with the bolt 15. The upper ends of the end plates 10 and 11 are captured by a pair of elongated plates 20 and 21 having a generally L-shaped cross section to extend downwardly over the upper ends of the end plates 10 and 11 and receive a pair of elongate bolts extended therethrough to secure the parts together, with one of the bolts being shown at 22 and having a washer and nut 23 threaded to the other end thereof.

A yoke 25 is positioned between the end plates 10 and 11 and has a pair of generally rounded elongate sections, one of which is shown at 26, to receive bolts extending therethrough and with bolt 22 shown extended therethrough in FIG. 2. A trunnion 30 is pivotally connected to a bifurcated end of the yoke 25 by means of a connecting pin 31.

As shown particularly in FIG. 2, the rounded elongate sections 26 of the yoke 25 are recessed, as shown at 35, whereby an upper corner 36 of a center plate 17 engages against the bolt to assist in alignment of the center plates relative to the structure of the sheave block.

A series of sheaves 40, 41, 42 and 43 are mounted between the end plates 10 and 11 and supported by said central shaft 12 for rotation relative thereto. The center plates 17 separate one sheave from another and assist in guiding of a cable passing about the sheaves.

The mounting of the central shaft 12 and the association of a sheave therewith along with the seal assembly and other structure is shown particularly in FIG. 3. An end of the central shaft is received within a recess 50 provided in the end plate 11. Each of the sheaves is rotatably mounted on a tubular bearing 51 placed upon the central shaft 12, with this bearing preferably being of a fiberglass construction and being covered with "Teflon" which is a polytetrafluoroethylene material. The bearings 51 for the sheaves 40 and 41 are shown in FIG. 3.

A pair of seal assemblies is shown in FIG. 3, with one seal assembly being positioned between the end plate 11 and the sheave 40 and the second seal assembly being positioned between the sheaves 40 and 41. It will be understood that additional seal assemblies are provided between the remaining sheaves shown in FIG. 1 and also between the sheave 43 and the end plate 10.

Referring to a seal assembly as shown in FIG. 3, a spacer ring 60 is positioned between the end plate 11 and the sheave 40. The spacer ring is an annular member and its outer periphery 61 has a hard wearing smooth surface 59, provided by a metallic coating, such as chrome-plating. This spacer ring is free-floating relative to the central shaft 12. A pair of lip seals 62 and 63, in the form of annular members, is associated with the end plate 11 and the sheave 40, respectively. The lip seals are formed of elastic material and each has a part 64 and 65, respectively, which is coated with a hard wearing low friction bearing material to provide a sealing engagement with the outer periphery 61 of the spacer ring. This material is preferably "Teflon" which is a polytetrafluoroethylene material. Each of the lip seals 62 and 63 is carried by an annular member having a generally L-shaped cross section which is fitted into a suitable recess of the housing member and sheave, respectively, with these members being identified at 70 and 71.

The seal assembly associated with the sheaves 40 and 41 is of the same construction as that just described and the same reference numerals have been given to the same parts.

To complete the assembly of the sheaves within the sheave block, a series of thrust bearings are used. These thrust bearings are placed at both sides of a spacer ring and are constructed of fiberglass or the like material and are covered with "Teflon". As shown in FIG. 3, an annular thrust bearing 75 is positioned between the spacer ring 60 and the end plate 11 and a second annular thrust bearing 76 is positioned between the spacer ring 60 and the sheave 40 and has a central opening of a size to receive an end of the shaft bearing 51. Similarly, thrust bearings 77 and 78 are positioned at both sides of the spacer ring 60 located between sheaves 40 and 41.

Industrial Applicability

From the foregoing, it will be appreciated that a seal assembly made according to the invention provides a good running seal between relatively movable members. The seal assembly keeps dirt and water out of the areas of contact. A Teflon coated seal and Teflon coated bearing are provided which avoids the problem of periodic lubrication which is frequently difficult and time-consuming to perform because of the location of a structure, such as a sheave block, utilizing the seal assembly.

I claim:

1. A seal assembly for first and second members (11,40) mounted on a common shaft (12), said members having relative rotation therebetween, said seal assembly comprising:
   a spacer ring (60) mounted on said shaft (12) independently of said first and second members (11,40) and positioned to space the first member (11) from the second member (40); and
   a pair of lip seals (62,63) of elastic material, one of said lip seals being mounted on the first member (11) and the other of said lip seals being mounted on the second member (40) coaxially adjacent said one lip seal, each of the lip seals having a part (64/65) thereof surrounding and extending radially inwardly into sealing engagement with a radially outwardly facing surface (59) of the spacer ring (60).

2. A seal assembly as defined in claim 1 wherein said spacer ring (60) is chrome-plated and said parts have bearing material which is polytetrafluoroethylene.

3. A seal assembly as defined in claim 1 wherein a pair of annular thrust bearings (75,76) are positioned on said shaft (12), one to each side of said spacer ring (60), and of a diameter less than the spacer ring (60) to act between the spacer ring (60) and the adjacent first and second members (11, 40).

4. A seal assembly for mechanism having two relative rotatable members (11,40) with at least one of said members (11) being rotatably guided by a central shaft (12), said seal assembly comprising:
   a spacer ring (60) free floating on said shaft (12) and having a hard wearing smooth radially outer surface (59) and positioned between said members (11,40); and
   a pair of lip seals (62,63) of elastic material, one of said lip seals being mounted on one (11) of said members and the other of said lip seals being mounted on the other (40) of said members, each of said lip seals having a part (64,65) thereof defining a hard wearing low friction bearing surface for sealing engagement with said radially outer surface (59) of the spacer ring (60).

5. A seal assembly as defined in claim 4 wherein said spacer ring (60) has the outer periphery (61) thereof plated with a metallic material to define said surface (59).

6. A seal assembly as defined in claim 5 wherein said metallic material is chrome and said hard wearing low friction surface (59) is provided by a polytetrafluoroethylene coating.

7. A sheave block comprising:
   a housing (10,11) supporting a central shaft (12), at least one sheave (40) rotatably mounted on said shaft;
   a plurality of spacer rings (60) loose on said shaft and positioned one at each side of the sheave and between the sheave and the housing, said spacer rings having a chrome-plated radially outer periphery (61); and
   a plurality of annular lip seals (62,63) of elastic material each having a radially inwardly extending part (64,65) thereof coated with polytetrafluroethylene, said lip seals (62,63) being mounted in pairs on the sheave (40) and housing (10,11) in adjacent relation to each other to have said parts (64,65) of each pair of said plurality of lip seals (62,63) engage the radially outer periphery (61) of said spacer rings.

8. A sheave block having sealed dry bearings comprising:
   a housing (10,11) supporting a center shaft (12);
   a plurality of sheaves (40-43) rotatably mounted on said shaft;
   a plurality of free floating spacer rings (60) positioned on said shaft one between each pair of sheaves and one between a sheave and the housing, said spacer rings each having a chrome-plated outer periphery (61);
   a pair of annular thrust bearings (75,76) positioned one at each side of each spacer ring; and
   a plurality of annular lip seals (62,63) of elastic material each having a radially inner part thereof coated with polytetrafluoroethylene, said lip seals (62,63) being mounted on said sheaves and housing to have one pair of lip seals (62,63) associated with each spacer ring (60) and with said parts (64,65) thereof surrounding and extending radially inwardly to engage the outer periphery (61) of the spacer ring (60) to seal the areas of contact between said shaft, said sheaves and said thrust bearings.

* * * * *